(12) United States Patent
Väisänen (10) Patent No.: US 7,357,207 B2
(45) Date of Patent: Apr. 15, 2008

(54) NOSE CONE FOR A SNOWMOBILE (75) Inventor: Esa Väisänen, Rovaniemi (FI)

(73) Assignee: BRP Finland Oy, Rovaniemi (FI)

( * ) Notice: Subject to any disclaimer, the term of this patent is extended or adjusted under 35 U.S.C. 154(b) by 451 days.

(21) Appl. No.: 11/050,204

(22) Filed: Feb. 2, 2005

(65) Prior Publication Data

US 2006/0175106 A1   Aug. 10, 2006

(51) Int. Cl.
*B62M 27/02*   (2006.01)
(52) U.S. Cl. .................................... 180/190
(58) Field of Classification Search ......... 180/190, 180/68.1, 68.2
See application file for complete search history.

(56) References Cited

U.S. PATENT DOCUMENTS 4,008,777 A * 2/1977 Juto et al. .................. 180/182
5,251,718 A * 10/1993 Inagawa et al. ............ 180/190
6,439,328 B1 * 8/2002 Vaillancourt et al. ....... 180/68.1
6,973,985 B2 * 12/2005 Yatagai et al. ............. 180/68.2
7,222,689 B2 * 5/2007 Yatagai et al. ............. 180/190

* cited by examiner

*Primary Examiner*—Christopher P. Ellis
*Assistant Examiner*—Michael Stabley
(74) *Attorney, Agent, or Firm*—Osler, Hoskin & Harcourt LLP (57) ABSTRACT

A snowmobile includes a nose cone having an underbelly, first and second side walls and a top cover together defining a substantially conical enclosure for enclosing a forward end of the snowmobile. The top cover includes a pair of air inlets for admitting air into the engine compartment as well as air guides connected to the inlets for directing the air to desired regions of the engine compartment for improving engine performance. The top cover also includes grilles for filtering out snow and other debris. Furthermore, the air guides are designed to suppress engine noise.

18 Claims, 8 Drawing Sheets

NOSE CONE FOR A SNOWMOBILE

FIELD OF THE INVENTION

The present invention relates generally to a snowmobile and, more particularly, to the construction of the front portion of the snowmobile.

BACKGROUND OF THE INVENTION

Figure 1:
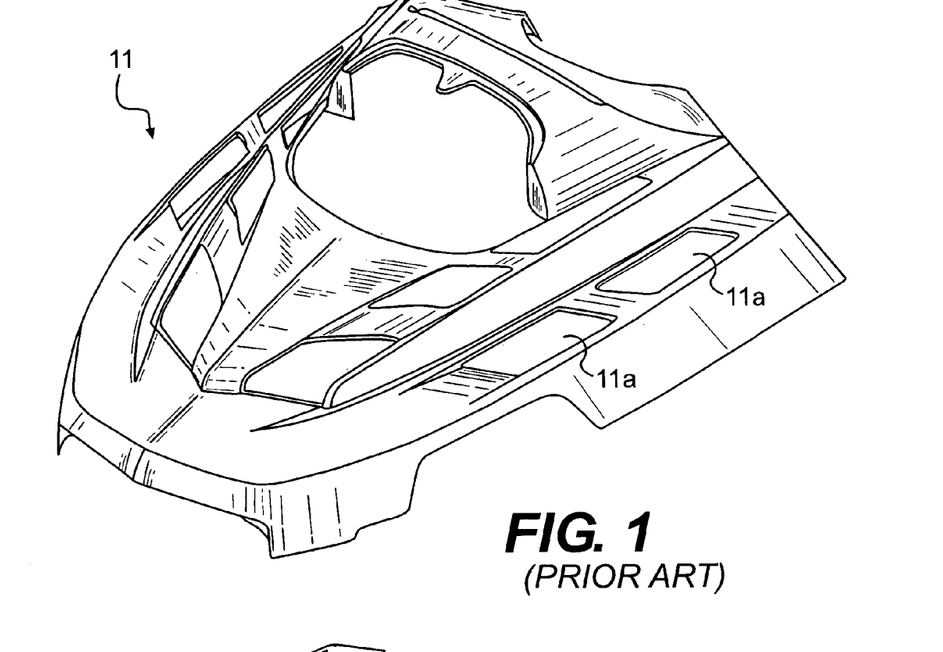
FIG. 1 is an isometric perspective view of a hood of a typical prior-art snowmobile.
Figure 2:
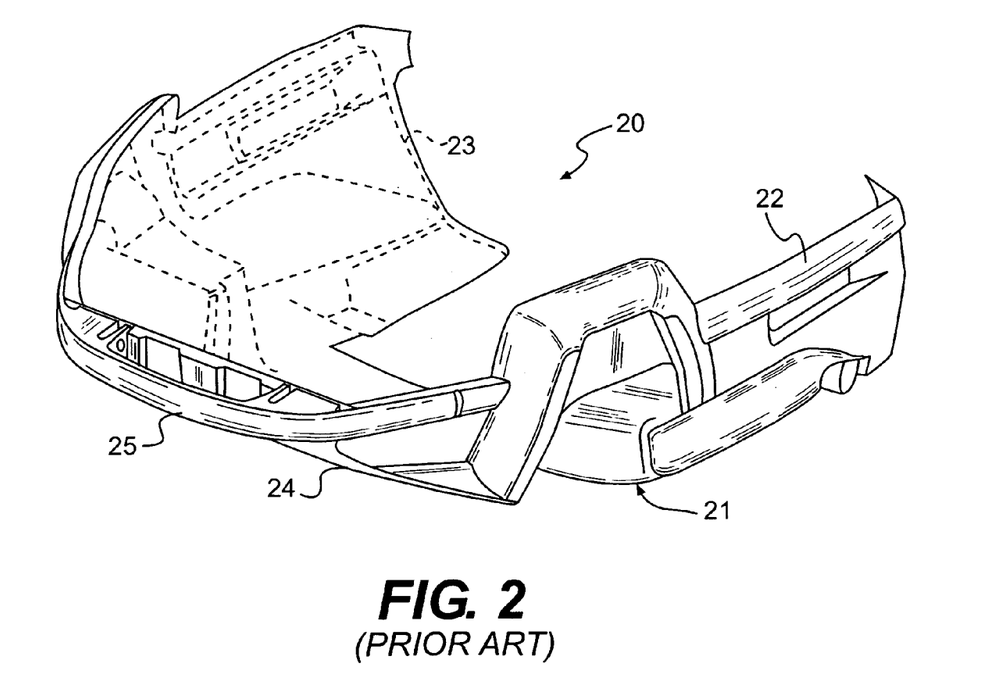
FIG. 2 is an isometric perspective view of a belly pan of a typical prior-art snowmobile.

A prior-art snowmobile typically includes a hood and a belly pan such as the ones illustrated in FIGS. 1 and 2, respectively. The hood and belly pan cooperate to enclose the engine, defining a forward portion of an engine compartment of a snowmobile. As shown in FIG. 1, a hood 11 includes at least one air inlet 11a for admitting ambient air into the engine compartment of the snowmobile, for cooling the engine and/or for supplying air to the engine. The air inlets are disposed with filtering grilles to inhibit snow or other debris from entering the engine compartment.

As shown in FIG. 2, a conventional belly pan 20 includes an underbelly 21, left and right side walls 22, 23 rising upwardly from the sides of the underbelly 21, and a front wall 24 extending upwardly from the front of the underbelly to define an open structure adapted to partially enclose a forward portion of the engine. The front wall 24 also includes a bumper 25, usually molded integrally with the belly pan 20. As noted above, the hood of FIG. 1 closes over the belly pan of FIG. 2 to enclose a forward portion of the engine compartment.

As is known in the art, the belly pan extends rearwardly under the engine, tuned pipe and other engine accessories to a point where the tunnel attaches to the engine cradle. The conventional, prior-art belly pan therefore has a rear opening for accepting the front of the tunnel, gas tank and other forwardly mounted components of the vehicle. Sometimes, the bottom of the belly pan is cut away so as to have the shape of the bottom of the engine cradle, which is normally made of sheet metal. Because the belly pan is normally made of plastic and the shape is not enclosed, the overall construction is very flexible and thus the attachment to the snowmobile has to be reinforced with metal brackets to ensure that the belly pan does not deform or break under its own weight.

In the prior art, however, the air inlets do not direct the air to the most effective locations within the engine compartment. Thus, there is a natural tendency to provide more air inlets than would be needed if the air were guided to the right places to ensure sufficient air cooling of the engine. By providing an excessive number (or excessive size) of air inlets, at least two shortcomings arise. First, the engine compartment becomes vulnerable to penetration of snow, particularly powdery snow, which can then clog up the engine compartment and the air inlets. Second, the snowmobile is noisier when many air inlets are provided. In other words, noise suppression is diminished when the size and/or number of air inlets is increased.

Therefore, it would be highly desirable to provide a nose cone for a snowmobile that overcomes at least one of the deficiencies of the prior art as described above.

SUMMARY OF THE INVENTION

It is an object of the present invention to provide a nose cone for a snowmobile that overcomes at least one of the deficiencies of the prior art.

In accordance with one aspect of the present invention, a nose cone for a snowmobile includes an underbelly; a first side wall extending upwardly from the underbelly; a second side wall extending upwardly from the underbelly, the second side wall being spaced apart from the first side wall; the side walls adapted to secure a snowmobile hood, and a top cover extending rearwardly from the forward end of the underbelly, and between the first and second side walls, such that the underbelly, side walls and top cover together define a generally conical nose for substantially enclosing a front end of the snowmobile.

Preferably, the top cover includes an opening defining an air inlet for admitting air into an engine compartment of the snowmobile.

More preferably, the top cover includes an air guide connected to the air inlet for conducting air to one or more regions within the engine compartment for optimizing engine performance.

More preferably, the air guides conduct air through passageways that are off-axis from the axes of admission of the air inlets for suppressing engine noise.

In accordance with another aspect of the present invention, a snowmobile includes a frame including a tunnel; an engine disposed on the frame; a drive track disposed below and supported by the tunnel and operatively connected to the engine for propulsion of the snowmobile; a straddle seat disposed on the tunnel above the drive track and rearward of the engine; two steerable skis disposed on the frame, each via a front suspension; and a nose cone as described in the preceding paragraphs, the nose cone being connected to a forward portion of the frame.

The nose cone described in the foregoing paragraphs provides a more structurally rigid body that the belly pans of the prior art. The nose cone also provides a more optimal number and configuration of air inlets that suppress engine noise while admitting and guiding air to the regions of the engine that most require airflow.

Other features and advantages of the present invention will be better understood with reference to the preferred embodiment described hereinafter.

BRIEF DESCRIPTION OF THE DRAWINGS

Having thus generally described the nature of the present invention, reference will now be made to the accompanying drawings by way of illustration showing a preferred embodiment, in which.

DETAILED DESCRIPTION OF THE PREFERRED EMBODIMENT

Figure 3:
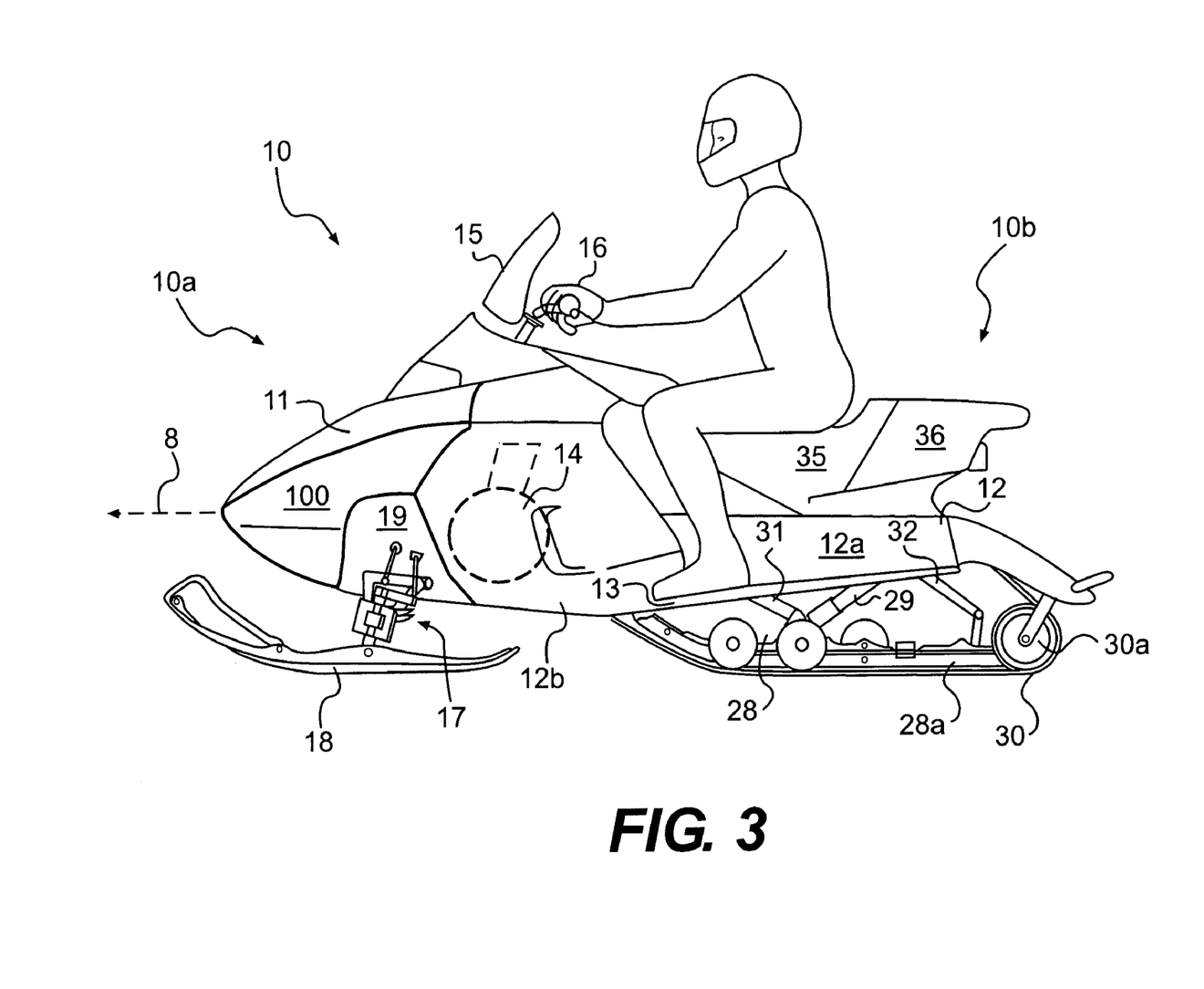
FIG. 3 is a side view of a snowmobile incorporating a nose cone in accordance with an embodiment of the present invention.

Referring now to FIG. 3, a snowmobile incorporating an embodiment of the present invention is designated generally by reference numeral 10. Although certain aspects of the present invention are applicable in other types of vehicles, the present invention has particular utility in connection with snowmobiles.

The snowmobile 10 includes a forward end 10a and a rearward end 10b which are defined consistently with a forward travel direction 8 of the vehicle. The snowmobile 10 includes a frame or chassis 12 which normally includes a rear tunnel 12a, an engine cradle portion 12b and a front suspension assembly portion 19. An engine 14, which is schematically illustrated in dotted lines in FIG. 3, is carried by the engine cradle portion 12b of the frame 12. A ski and steering assembly (not indicated) is provided, in which two skis 18 are positioned at the forward end 10a of the snowmobile 10 and are attached to the front suspension assembly portion 19 of the frame 12 through a front suspension assembly 17. The front suspension assembly 17 includes ski legs, supporting arms and ball joints (not shown) for operatively joining the respective ski legs, supporting arms and a steering column. The steering column at its upper end is attached to a steering device such as a handlebar 16 which is positioned forward of a rider to rotate the skis 18, in order to steer the vehicle.

An endless drive track 30 is positioned at the rear end 10b of the snowmobile 10 and is disposed under tunnel 12a, being connected operatively to the engine 14 through a belt transmission system (not shown). Thus, the endless drive track 30 is driven to run about a rear suspension assembly 28 for propulsion of the snowmobile 10. The rear suspension assembly 28 includes a pair of slide rails 28a in sliding contact with the endless drive track 30. The rear suspension assembly 28 also includes one or more shock absorbers 29 which may further include a coil spring (not shown) surrounding the individual shock absorbers 29. Front and rear suspension arms 31 and 32 are provided to attach the slide rails 28a to the frame (chassis) 12. One or more idler wheels 30a are also provided in the rear suspension assembly 28.

At the front end 10a of the snowmobile 10, a hood 11 covers the nose cone 100 enclosing the engine 14 and the belt transmission system, thereby providing an external shell that not only helps protect the engine 14 and the belt transmission system, but can also be decorated to make the snowmobile 10 more aesthetically pleasing. Typically the hood includes one or more holes therethrough to allow air to enter into the engine compartment 14b. These holes can be misaligned with the air inlets 142 and 144 of the nose cone to improved engine noise suppression and prevent snow and other debris from entering directly into the engine compartment 14b. Typically, one or more side panels can be opened to allow access to the engine 14 and the belt transmission system when this is required, for example, for inspection or maintenance of the engine 14 and/or the belt transmission system. In the particular snowmobile 10 shown in FIG. 3, the side panels can be opened along a vertical axis to swing away from the snowmobile 10. A windshield 15 may be connected to the snowmobile 10 or directly to the handlebar 16. The windshield acts as a wind screen to lessen the force of the air on the rider while the snowmobile 10 is moving.

The engine 14 is a type of internal combustion engine that is supported on the frame 12 and is located at the engine cradle portion 12b. The internal construction of the engine 14 may be of any known type, however the engine 14 drives an engine output shaft (not shown) that rotates about a horizontally disposed axis that extends generally transversely to a travel direction (or longitudinal centerline) 8 of the snowmobile 10. The engine output shaft drives the belt transmission system for transmitting torque to the endless drive track 30 for propulsion of the snowmobile 10.

A straddle-type seat 35 is positioned atop the frame 12 and extends to the rear end 10b of the snowmobile 10. A rear portion of the seat 36 may include a storage compartment or can be used to accommodate a passenger seat (not indicated). Two footrests 13 are positioned on opposite sides of the snowmobile 10 below the seat to accommodate the driver's feet.

Figure 4:
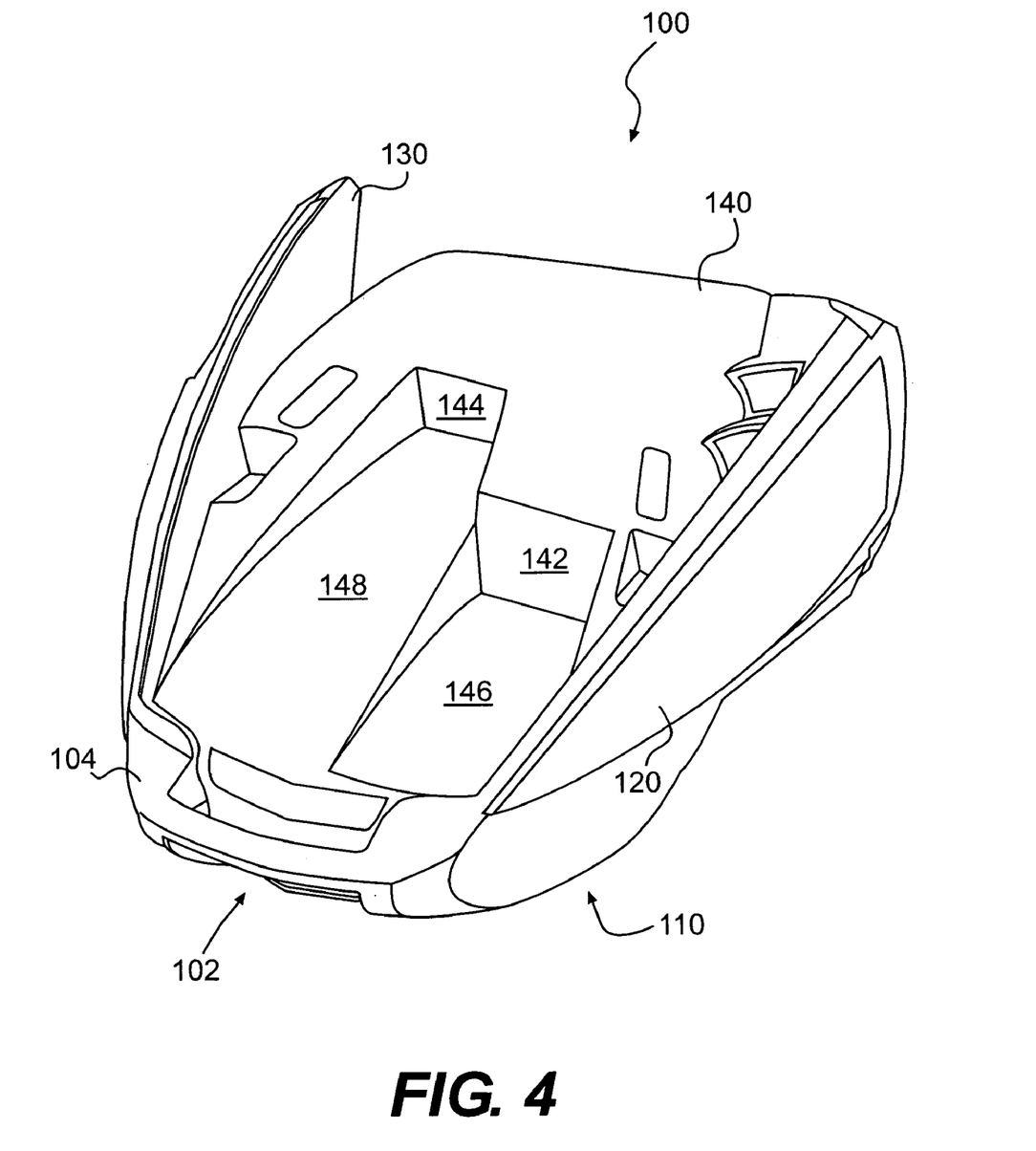
FIG. 4 is an isometric perspective view of a nose cone for a snowmobile in accordance with a preferred embodiment of the present invention.
Figure 5:
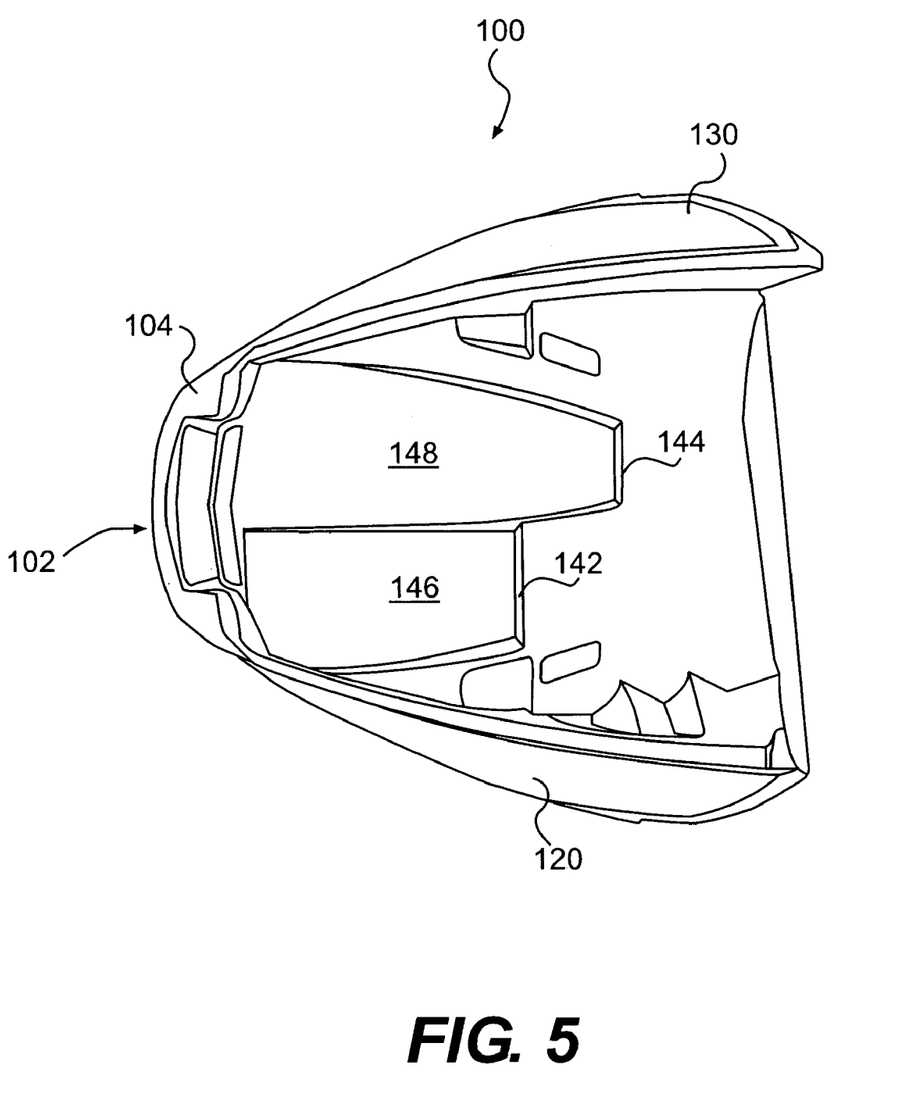
FIG. 5 is a top plan view of the nose cone in accordance with the preferred embodiment of the present invention.

FIGS. 4 to 8 show various views of a nose cone 100 in accordance with the preferred embodiment of the present invention. Referring first to FIGS. 4 and 5, the nose cone 100 includes an underbelly 110, a first side wall 120 extending upwardly from the underbelly, and a second side wall 130 extending upwardly from the underbelly. The second side wall is spaced apart from the first side wall as shown in FIGS. 4 and 5. The top edges of the side walls adapted to support the hood 11 thereon. Preferably, the hood is pivotally connected to the forward end 102 of the nose cone 100. The nose cone further includes a top cover 140 extending upwardly and rearwardly from a forward end 102 of the underbelly. The top cover 140 also extends, as shown, between the first and second side walls 120, 130 to define an "upper wall". In other words, the underbelly 110, the first and second side walls 120, 130 and the top cover 140 together define a generally conical nose for substantially enclosing a front end of the snowmobile.

As further illustrated in FIGS. 4 and 5, the top cover 140 of the nose cone 100 has a pair of openings defining air inlets 142, 144. The top cover 140 can also include a pair of air scoops 146, 148 defining planar regions leading up to the respective air inlets 142, 144. The air inlets are preferably orthogonal to a forward, travel direction of the snowmobile to increase air intake although it should be understood that the air inlets can be oblique or even normal to the travel direction of the vehicle. The air inlets 142, 144 includes respective air guides, preferably integrally molded to the underside of the top cover 140. The air guides are ducts or passageways connected to the air inlets for conducting air to the regions of the engine compartment where airflow is most desired. The air guides preferably conduct air through passageways that are off-axis from axes of admission of the air inlets. By "off-axis", it is meant that the air guides are not merely straight extensions of the air inlets. In other words, the air does not flow straight into the engine compartment along straight air ducts. Rather, the air is routed along axes that are not aligned with the ducts, preferably been routed along a section of ductway that is at least perpendicular to the air inlet. A circuitous "off-axis" air guide will act as a noise baffle to suppress engine noise. The air inlets can also include filtering grilles (not shown) for inhibiting snow or other debris from entering the engine compartment of the snowmobile. The front of the nose cone can include an integrally molded bumper 104 (or attachment points for attaching a separate bumper).

Figure 6:
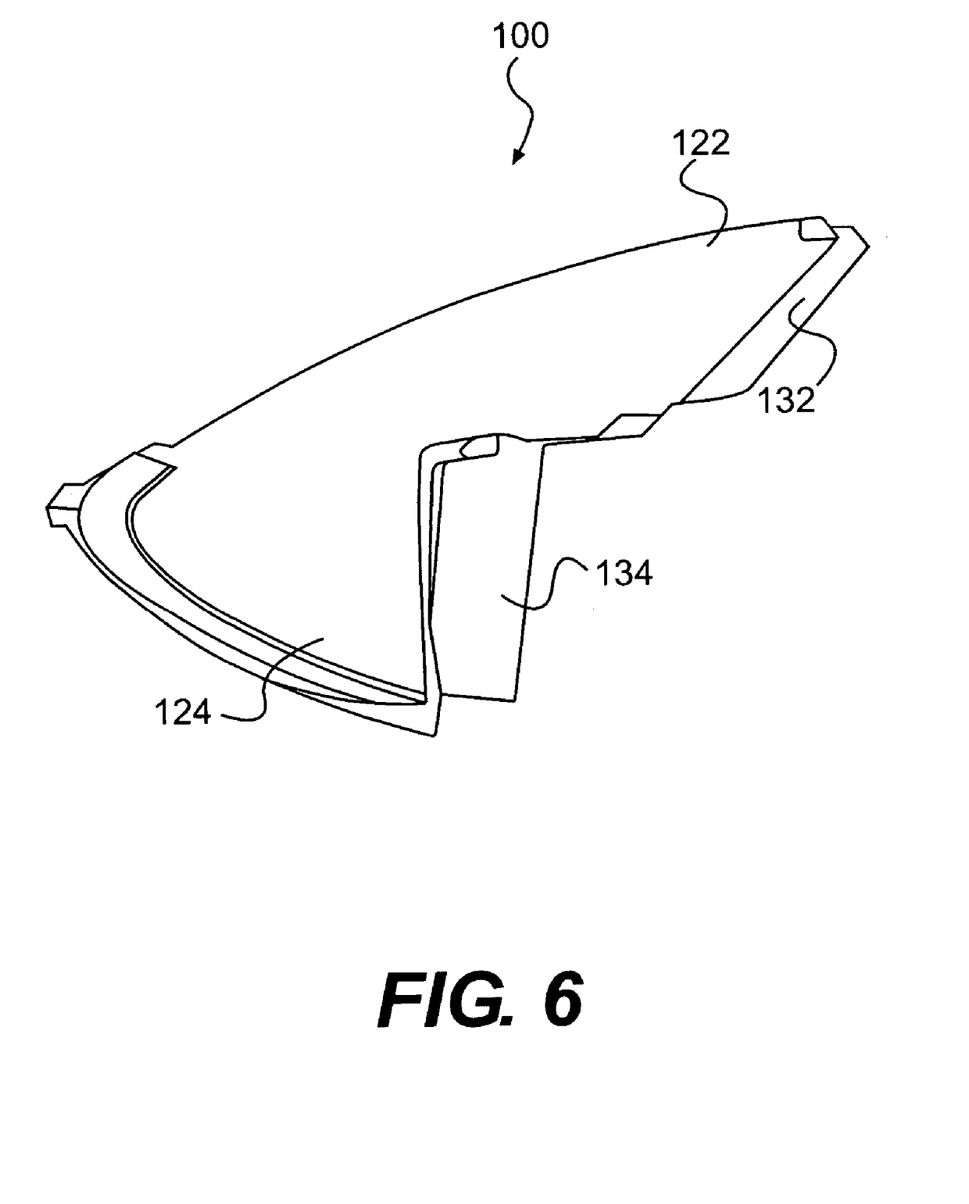
FIG. 6 is a side view of the nose cone in accordance with the preferred embodiment of the present invention.

Other features of the nose cone 100 will now be described with reference to FIGS. 6 to 8. FIG. 6 is a side view of the nose cone 100 showing that upper portions 122, 132 of the first and second side walls 120, 130, respectively extend more rearwardly than respective lower portions 124, 134 of the side walls. The nose cone is thus able to connect forward of the engine cradle at the forward end of the snowmobile. Nose cone 100 is preferably a unitary roll-molded structure.

Figure 7:
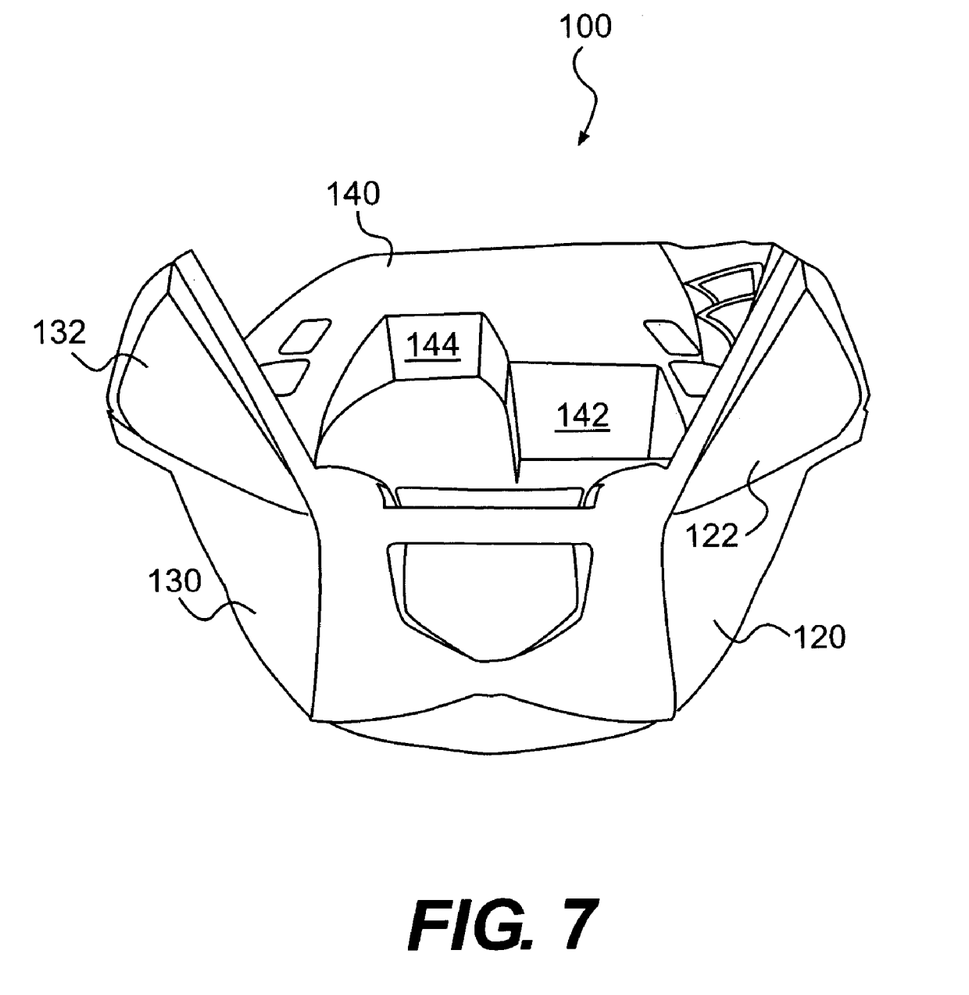
FIG. 7 is a front view of the nose cone in accordance with the preferred embodiment of the present invention.

FIG. 7 shows a front view of the nose cone 100. The air inlets 142, 144 in the top cover 140 are preferably not the same size and are "staggered", (i.e. one air inlet in this case, the left air inlet 142 is forward of the right air inlet 144) to optimize airflow distribution within the engine compartment while also optimizing engine noise suppression. The nose cone is thus preferably not symmetrical. FIG. 7 also shows that the upper portions 122, 132 of the side walls 120, 130 flare laterally outwardly in an asymmetric manner, which accommodates packaging asymmetries of the forward portion of the snowmobile.

Figure 8:
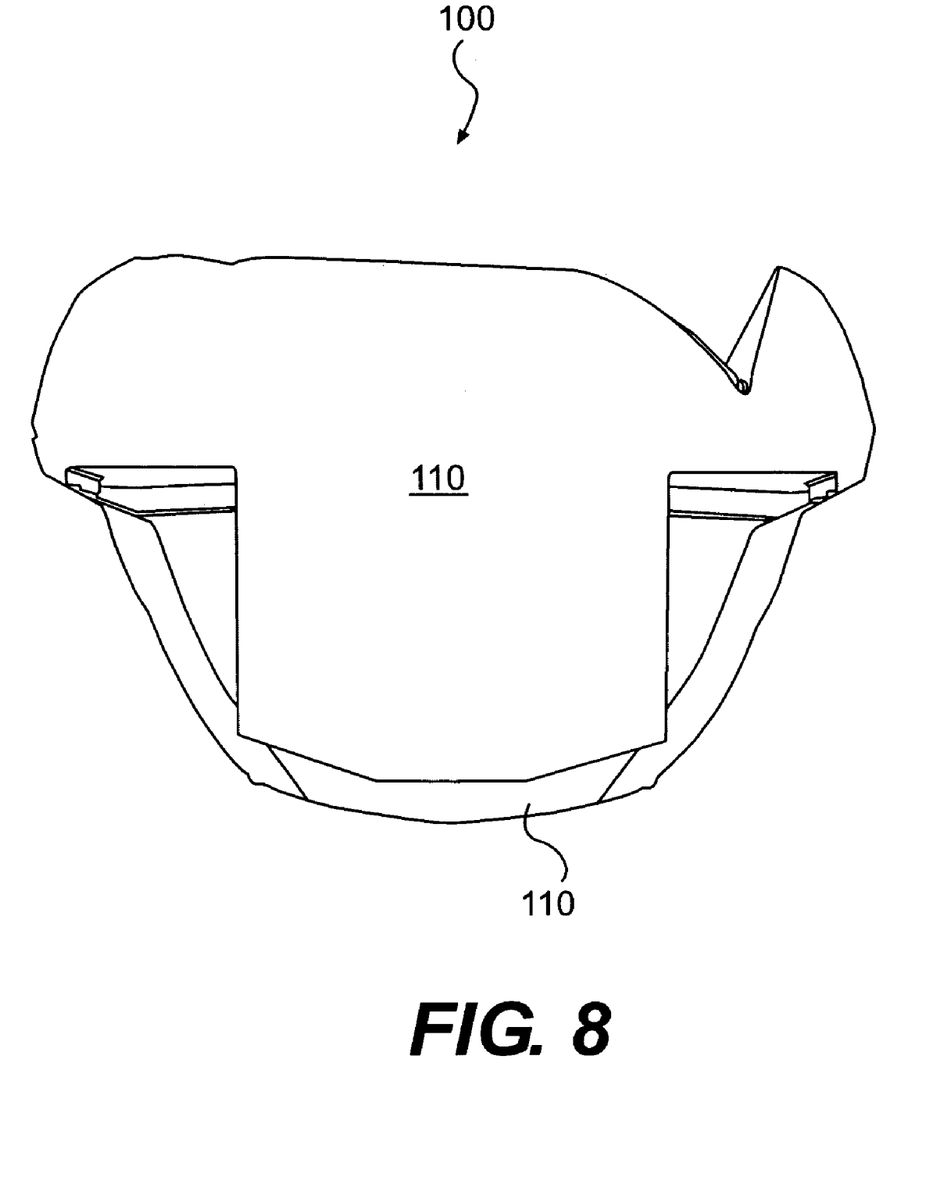
FIG. 8 is a rear view of the nose cone in accordance with the preferred embodiment of the present invention.

As referred to above, FIG. 8 shows the underbelly 110 that forms the bottom of the nose cone 100. The underbelly extends forward from the front suspension assembly 19 to the front end of the snowmobile.

Figure 9:
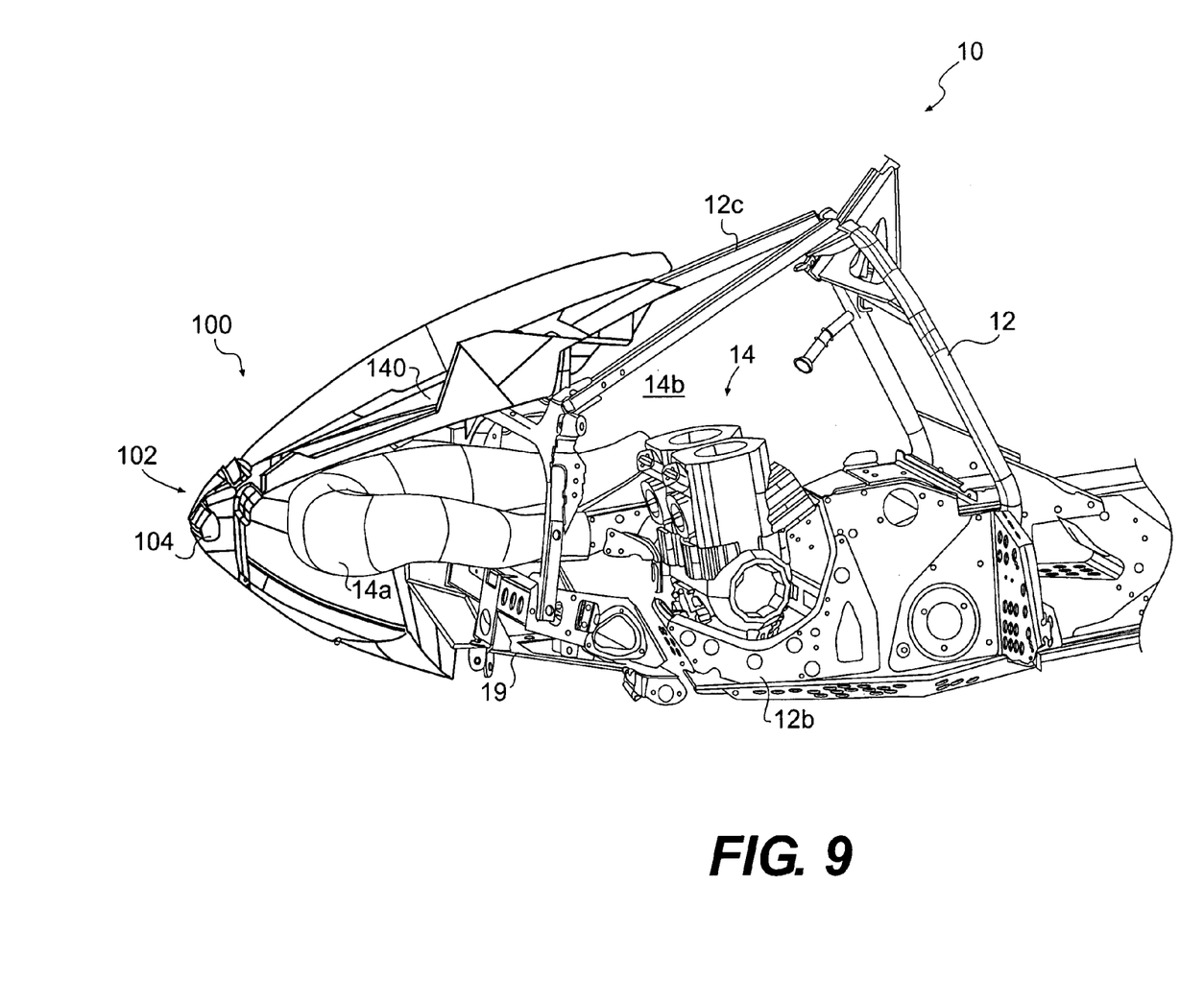
FIG. 9 is a cross-sectional view of the nose cone and forward portion of a snowmobile, in accordance with the preferred embodiment of the present invention.

FIG. 9 is a cross-sectional view of the nose cone 100 connected to a forward portion of the snowmobile 10 in accordance with the preferred embodiment of the present invention. In this preferred embodiment, the top cover 140 of the nose cone 100 extends over a tuned pipe 14a connected to the engine 14 and also overlays at least a portion of the engine. In other words, the nose cone cooperates with the frame to enclose a forward portion of an engine compartment 14b. As shown in FIG. 9, the nose cone 100 connects to the frame of the snowmobile at a number of locations. In this preferred embodiment, a lower portion of the nose cone 100 connects a forward portion of the engine cradle 12b through a portion of the front suspension assembly 19 and an upper portion of the nose cone connects to the frame members 12c that form a pyramidal frame structure at the front of the vehicle.

In operation, the nose cone, once attached to the front end of the snowmobile, provides a rigid structure for enclosing the forward portion of the engine compartment of the snowmobile. Air inlets and guides which are integrally molded in the top cover of the nose cone help to direct air to those regions of the engine compartment where airflow is most needed. The air inlets and air guides are configured to suppress engine noise while admitting sufficient air for optimal engine performance.

Modifications and improvements to the above-described embodiment of the present invention may become apparent to those skilled in the art. The foregoing description is intended to be exemplary rather than limiting. The scope of the present invention is therefore intended to be limited solely by the scope of the appended claims.

I claim:

1. A nose cone for a snowmobile, the nose cone comprising:
    an underbelly having a forward end;
    a first side wall extending upwardly from the underbelly;
    a second side wall extending upwardly from the underbelly, the second side wall being spaced apart from the first side wall, the side walls adapted to secure a snowmobile hood;
    a top cover extending rearwardly from the forward end of the underbelly, and between the first and second side walls; and
    a hood pivotally connected to the forward end of the underbelly and supported on the first and second side walls, the hood being disposed above the top cover, the hood being pivotable with respect to the top cover,
    such that the underbelly, side walls and top cover together define a generally conical nose for substantially enclosing a front end of the snowmobile.

2. The nose cone as claimed in claim 1 wherein the top cover extends over a tuned pipe connected to an engine of the snowmobile.

3. The nose cone as claimed in claim 2 wherein the top cover further extends over at least a substantial portion of the engine.

4. The nose cone as claimed in claim 1 wherein the top cover includes an opening defining an air inlet for admitting air into an engine compartment of the snowmobile.

5. The nose cone as claimed in claim 4 wherein the top cover further comprises an air guide connected to the air inlet for conducting air to at least one region within the engine compartment for optimizing engine performance.

6. The nose cone as claimed in claim 5 wherein the air inlet further comprises a filtering grille for inhibiting snow and other debris from entering the engine compartment.

7. The nose cone as claimed in claim 1 wherein the top cover comprises a pair of air scoops having respective air inlets orthogonal to a forward, travel direction of the snowmobile.

8. The nose cone as claimed in claim 7 wherein the top cover further comprises air guides connected to the air inlets for conducting air to regions within the engine compartment where directed airflow optimizes engine performance.

9. The nose cone as claimed in claim 1 further comprising a plurality of brackets for affixing the nose cone to a frame of the snowmobile.

10. A snowmobile comprising:
    a frame including a tunnel;
    an engine disposed on the frame;
    a drive track disposed below and supported by the tunnel and operatively connected to the engine for propulsion of the snowmobile;

a straddle seat disposed on the tunnel above the drive track and rearward of the engine;

two steerable skis disposed on the frame, each via a front suspension; and a nose cone as claimed in claim 1, the nose cone being connected to a forward portion of the frame.

11. The snowmobile as claimed in claim 10 wherein the top cover extends over a tuned pipe connected to an engine of the snowmobile.

12. The snowmobile as claimed in claim 11 wherein the top cover further extends over at least a substantial portion of the engine.

13. The snowmobile as claimed in claim 10 wherein the top cover includes an opening defining an air inlet for admitting air into an engine compartment of the snowmobile.

14. The snowmobile as claimed in claim 13 wherein the top cover further comprises an air guide connected to the air inlet for conducting air to one or more regions within the engine compartment for optimizing engine performance.

15. The snowmobile as claimed in claim 14 wherein the air inlet further comprises a filtering grille for inhibiting snow and other debris from entering the engine compartment.

16. The snowmobile as claimed in claim 10 wherein the top cover comprises a pair of air scoops having respective air inlets orthogonal to a forward, travel direction of the snowmobile.

17. The snowmobile as claimed in claim 16 wherein the top cover further comprises air guides connected to the air inlets for conducting air to regions within the engine compartment where directed airflow optimizes engine performance.

18. The snowmobile as claimed in claim 10 further comprising a plurality of brackets for affixing the nose cone to a frame of the snowmobile.

* * * * *